United States Patent
Lovisetto (10) Patent No.: US 10,654,350 B1
(45) Date of Patent: *May 19, 2020

(54) AUTOMATIC VEHICLE SUNSHADE SYSTEM

(71) Applicant: Carwig LLC, Phoenix, AZ (US)

(72) Inventor: Alessandro Lovisetto, Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/357,201

(22) Filed: Mar. 18, 2019

Related U.S. Application Data (63) Continuation-in-part of application No. 15/917,588, filed on Mar. 10, 2018, now Pat. No. 10,232,696.

(51) Int. Cl.
*B60J 11/04* (2006.01)
*E04H 15/06* (2006.01)
*E04H 15/54* (2006.01)
*E04H 15/32* (2006.01)

(52) U.S. Cl.
CPC .............. *B60J 11/04* (2013.01); *E04H 15/06* (2013.01); *E04H 15/54* (2013.01); *E04H 2015/326* (2013.01)

(58) Field of Classification Search
CPC .......... B60J 11/04; E04H 15/02; E04H 15/06; E04H 2015/326; E04H 15/60
USPC ............. 135/88.01, 88.05, 88.07, 88.14, 127
See application file for complete search history.

(56) References Cited

U.S. PATENT DOCUMENTS

| | | | |
|---|---|---|---|
| 2,942,794 A | 3/1957 | Huso | |
| 3,848,821 A | 11/1974 | Scheel | |
| 4,706,696 A | 11/1987 | Gillis | |
| 5,921,259 A | 7/1999 | Ehler | |
| 5,924,669 A * | 7/1999 | Richins | ........... G09F 17/00 116/174 |
| 6,981,509 B2 | 1/2006 | Sharapov | |
| 8,225,807 B1 | 7/2012 | Cain | |
| 8,651,555 B2 | 2/2014 | Chan | |
| 8,752,880 B1 | 6/2014 | Morazan | |
| 8,910,997 B2 | 12/2014 | Featherman et al. | |
| 9,701,185 B1 | 7/2017 | Usanga et al. | |
| 9,783,033 B2 | 10/2017 | Wang | |
| 9,815,359 B2 | 11/2017 | Morazan | |
| 10,232,696 B1 * | 3/2019 | Lovisetto | ........... E04H 15/06 |
| 2003/0020329 A1 | 1/2003 | Herbst et al. | |
| 2004/0178618 A1 | 9/2004 | Rhea et al. | |
| 2006/0162873 A1 | 7/2006 | Dao | |
| 2010/0285940 A1 * | 11/2010 | Douyere | ........... A63B 22/0002 482/139 |

(Continued)

FOREIGN PATENT DOCUMENTS

WO    WO-2008034279 A2 *    3/2008    ........... E04H 15/322

*Primary Examiner* — David R Dunn
*Assistant Examiner* — Danielle Jackson (57) ABSTRACT

An automatic sunshade system mounted to a cabin-top of a vehicle automatically deploys from a stored and retracted orientation to a deployed orientation. The canopy is coupled to a plurality of support members that are wound about a hub and have stored energy when in retracted orientation. The support members unwind from the hub automatically and spread the canopy out over the vehicle. The support members may comprise a plurality of elongated portions that are coupled together by an elastic tether. The canopy may be retracted manual with a crank or by a motor that winds the support members around the hub.

13 Claims, 9 Drawing Sheets

(56) References Cited

U.S. PATENT DOCUMENTS

| | | |
|---|---|---|
| 2016/0208514 A1 | 7/2016 | Finck |
| 2016/0288635 A1* | 10/2016 | Morazan ................. B60J 11/04 |
| 2017/0129320 A1 | 5/2017 | Tran |
| 2017/0334270 A1 | 11/2017 | Gurley et al. |
| 2018/0163428 A1* | 6/2018 | Veracini ................ B60P 3/0257 |

* cited by examiner

AUTOMATIC VEHICLE SUNSHADE SYSTEM

CROSS REFERENCE TO RELATED APPLICATIONS

This application is a continuation in part of U.S. patent application Ser. No. 15/917,588, filed on Mar. 10, 2018, entitled Automatic Vehicle Sunshade System and issued as U.S. Pat. No. 10,232,696 on Mar. 19, 2019; the entirety of which is hereby incorporated by reference herein.

BACKGROUND OF THE INVENTION

Field of the Invention

The present invention is directed to an automatically deploying vehicle sunshade system.

Background

Vehicles park in uncovered parking lots are exposed to the sunlight and can become very hot. The interior of the vehicle can reach temperatures of 140° F. or more which can damage electronics and increases the degradation of the interior. Many people place a sun visor on the inside of their front windshield to block the sun but this provides limited benefits.

SUMMARY OF THE INVENTION

The invention is directed to an automatically deploying sunshade system for a vehicle that deploys a canopy over the cabin of the vehicle to block the sun. An exemplary sunshade system deploys the canopy over the entire cabin of the vehicle and prevents direct sunlight from entering the vehicle through any of the windows including the front windshield, the side windows and the back window. An exemplary sunshade system automatically deploys using stored energy in support members, such as segmented support members having an elastic tether. The support members are wound about a hub in a stored configuration and have stored energy. Upon deployment, the support members unwind about the hub and carry with a canopy that extends between the support member. This coiled energy makes deploying the sunshade canopy quick and easy. The canopy can be retracted manually using a crank or may comprise a motor, such as an electric motor, that can be activated to wind the support members back around the hub. The motor may be configured with the hub and may spin the hub to pull and retract the canopy and support members therein. A crank may have a handle that is coupled with the hub, whereby rotation of the crank rotates the hub. The crank may have an extension that extends out from the hub to the handle to enable rotation of the handle while standing next to the vehicle. The support member and canopy may be stored in a canopy enclosure that can be mounted to the vehicle, such as to the cabin-top of the vehicle.

The canopy may be flexible sheet of material, such as a fabric, or sheet of polymer or foil. An exemplary canopy is lightweight and durable and may comprise a woven or non-woven fabric and may comprise a coating, such as a polymer coating. An exemplary canopy comprises is a ripstop fabric. An exemplary canopy may have a reflective surface on the top to reflect the sunlight away from the vehicle.

The support members are semi-rigid supports, such as rods or tubes and may be metal or a composite, such a carbon fiber. The support members may flex along the length but have sufficient beam strength to support the canopy out over the vehicle in a deployed state. An exemplary support member is a continuous member such as a continuous length of material, such as a tube or rod, for example. An exemplary support member may be a segmented support member having a plurality of elongated portions that are coupled together by an elastic tether. A segmented support member may provide effective support for the canopy in a deployed orientation and may be flexible enough to allow winding and unwinding about the hub. The support members allow the canopy to held in position over the vehicle without any additional supports, such as straps or ties, that would require additional time to anchor. This unique system enables quick and easy deployment without additional anchoring or support of the canopy.

The canopy may be detachably attachable to the support members. An exemplary canopy may comprise a receiver, such as a pocket of sleeve, for receiving and retaining the extended end of the canopy. The canopy may be removed from the support members and changed out to a different type of canopy. For example, a person may have a first canopy of a first color or comprising a first logo, name or symbol, such as a team name and logo and may also have a second canopy of a second color or comprising a second logo, name or symbol, such as a team name or logo. The canopy may be switched out when the person attends a different sporting event or for the different sports seasons, for example.

An exemplary sunshade system comprises a canopy enclosure for storing the canopy and support members. The canopy enclosure may have a top and bottom portion that opens to expose a perimeter gap from which the canopy deploys. The top and bottom portions may be latched or otherwise connected together to prevent the canopy enclosure from opening during transport or when driving the vehicle. A photovoltaic cell, may be configured on the canopy enclosure, or on any portion of the sunshade system, such as a flexible photovoltaic cell configured with the canopy. The photovoltaic cell may generate electricity that can be used to power the motor for retracting the canopy and supports back into the canopy enclosure or for powering components of the vehicle, or for other power requirements. A sunshade system comprising a photovoltaic cell may allow tailgaters or campers, for example, to power electronic devices, such as radios, or televisions through the photovoltaic cell and associated power system. A photovoltaic cell may charge a battery, and the battery may power the electric motor to retract the canopy.

The canopy enclosure may be mounted to the top of a vehicle to allow the canopy to expand out over the windows of the vehicle.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE
ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figures 1, 2:
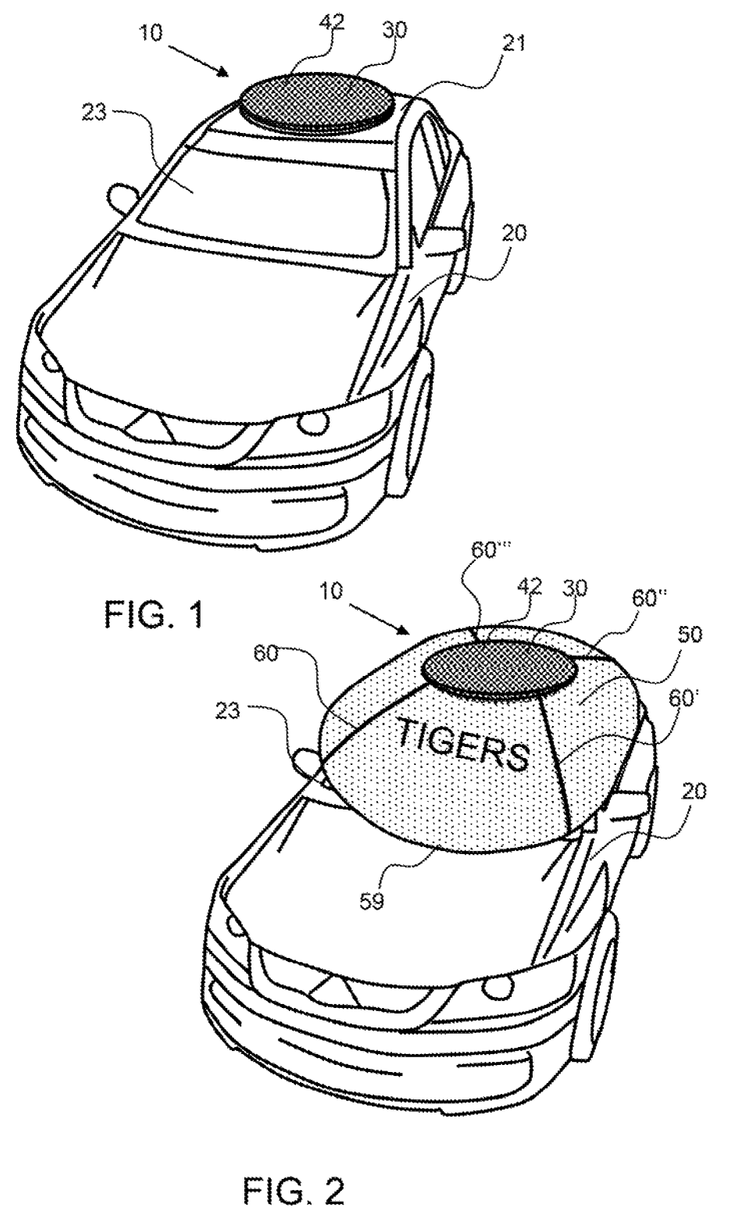
FIG. 1 shows a perspective view of a vehicle with an exemplary sunshade system mounted to the cabin-top of the vehicle and in a retracted orientation.
FIG. 2 shows a perspective view of a vehicle with an exemplary sunshade system mounted to the cabin-top of the vehicle and in a deployed orientation.

As shown in FIG. 1, a vehicle 20 is configured with an exemplary sunshade system 10 mounted to the cabin-top 21 of the vehicle and in a retracted orientation.

As shown in FIG. 2, a vehicle 20 is configured with an exemplary sunshade system mounted 10 to the cabin-top 21 of the vehicle and in a deployed orientation. The canopy 50 is extended out from the canopy enclosure 30. The canopy perimeter 59 extends over the windshield 23 of the vehicle and out over the sides and back of the vehicle. The canopy 50 is retained in the deployed orientation by support members 60-60''' that extend from a hub in the canopy enclosure. A team name is printed on the canopy. As described herein, the canopy may be detachably attachable to the sunshade system and from the support members to allow someone to change out the canopy for different events or times of year. For example, a person may change from a first canopy having a first team name and/or logo to a second canopy having a second team name and/or logo printed thereon.

Figure 3:
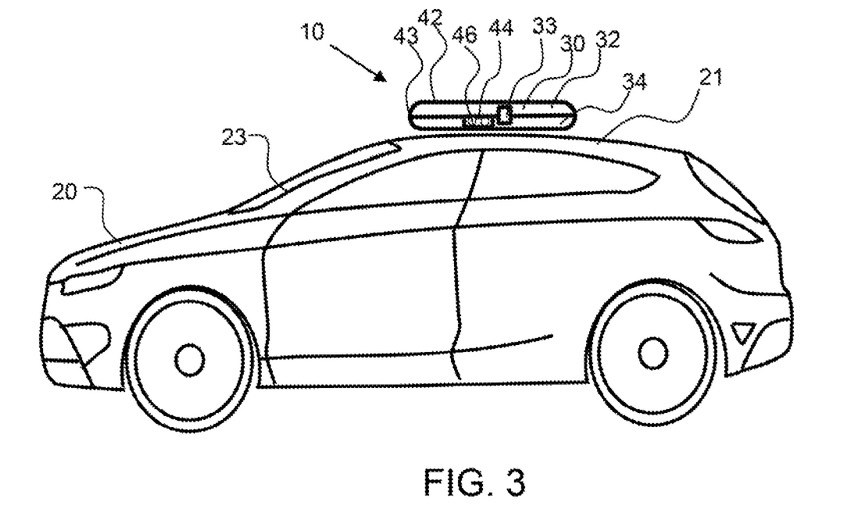
FIG. 3 shows a side view of a vehicle with an exemplary sunshade system mounted to the cabin-top of the vehicle and in a retracted orientation.
Figure 4:
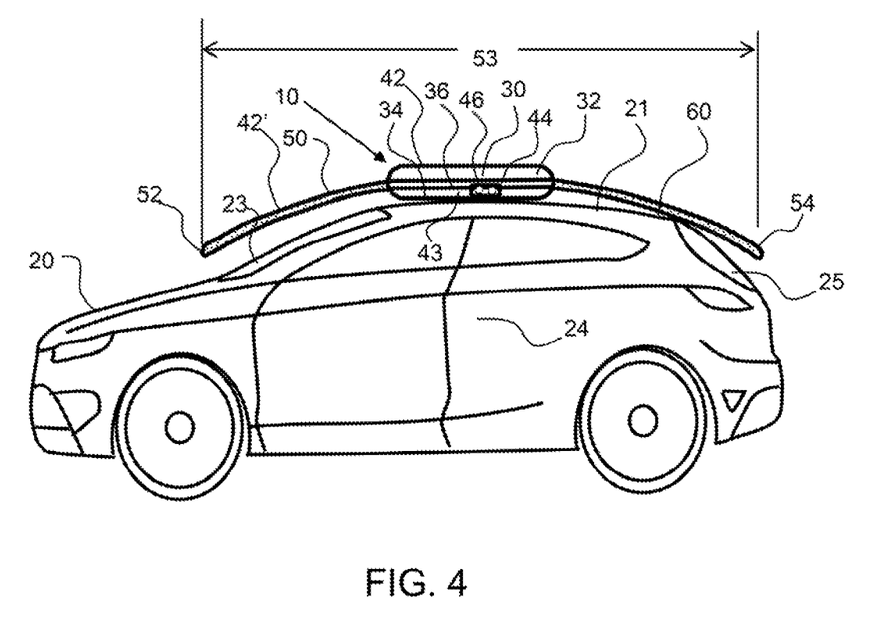
FIG. 4 shows a side view of a vehicle with an exemplary sunshade system mounted to the cabin-top of the vehicle and in a deployed orientation.

Referring now to FIGS. 3 and 4, a vehicle 20 is configured with an exemplary sunshade system 10 mounted to the cabin-top 21 of the vehicle. As shown in FIG. 3, the canopy is in a retracted orientation. As shown in FIG. 4, a vehicle 20 is configured with an exemplary sunshade system 10 mounted to the cabin-top 21 of the vehicle and in a deployed orientation. The canopy 50 extends out from the canopy enclosure 30 and extends a length 53 from a front extension 52 to a back extension 54 position. The canopy 50 extends over the windshield 23 and the back window 25 of the vehicle. The canopy enclosure has a top 32, a bottom 34 and a perimeter gap 36 from which the canopy deploys from. The canopy is supported in the deployed orientation by support members 60. The support members may extend along a curved or arced shape which may be a more secure orientation for resisting deflection due to wind. The canopy enclosure 30 comprises a photovoltaic cell 42, that produces electricity. A power system 44, may convert the electrical power generated by the photovoltaic cell or cells from DC to AC power and may regulate the voltage to an appropriate voltage for use. A power system may have an DC to AC converted, a voltage regulator and the like. A plug 46 may be configured for coupling an electronic device to the power system, such as a radio or television. The plug is shown coupled to the bottom portion of the canopy enclosure and on the driver's side of the vehicle. This position would enable a person to plug in an electronic device with the canopy deployed, as the bottom of the canopy enclosure is accessible from under the canopy. A flexible photovoltaic cell 42' may be configured with the canopy and provide an enlarged area for power generation over the photovoltaic cell 42 configured on the top of the canopy enclosure 30. The top 32 of the canopy enclosure 30 is secured to the bottom 34 of the canopy enclosure by a latch 33. Note that the photovoltaic cell may charge a battery 43 and the batter may provide power to the electric motor to retract the canopy.

Figure 5:
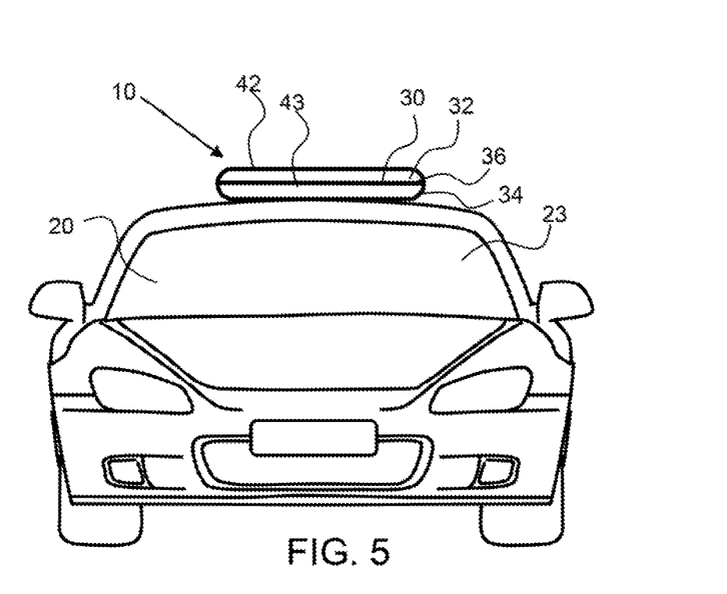
FIG. 5 shows a front view of a vehicle with an exemplary sunshade system mounted to the cabin-top of the vehicle and in a retracted orientation.

As shown in FIG. 5, a vehicle 20 is configured with an exemplary sunshade system 10 mounted to the cabin-top 21 of the vehicle and in a retracted orientation. The canopy enclosure is closed with the perimeter gap 36 being closed.

Figure 6:
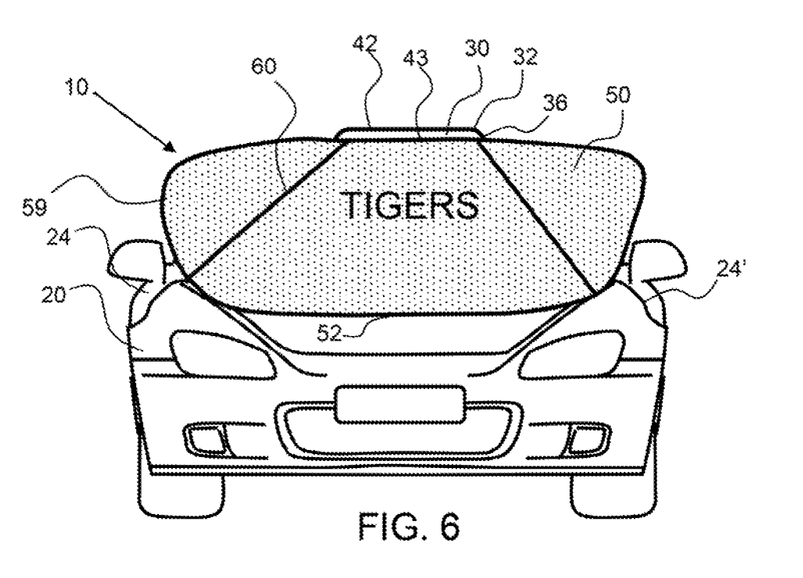
FIG. 6 shows a front view of a vehicle with an exemplary sunshade system mounted to the cabin-top of the vehicle and in a deployed orientation.

As shown in FIG. 6, a vehicle 20 is configured with an exemplary sunshade system 10 mounted to the cabin-top 21 of the vehicle and in a deployed orientation. The canopy 50 extends out from the canopy enclosure 30 and extends a length 53 from a front extension 52 to a back extension 54 position. The canopy 50 extends over the windshield 23 and the back window 25 of the vehicle. The canopy enclosure has a top 32, a bottom and a perimeter gap 36 from which the canopy deploys from. The canopy is supported in the deployed orientation by support members 60. The perimeter of the canopy 59 extends out over the sides 24, 24' of the vehicle.

Figures 7, 8:
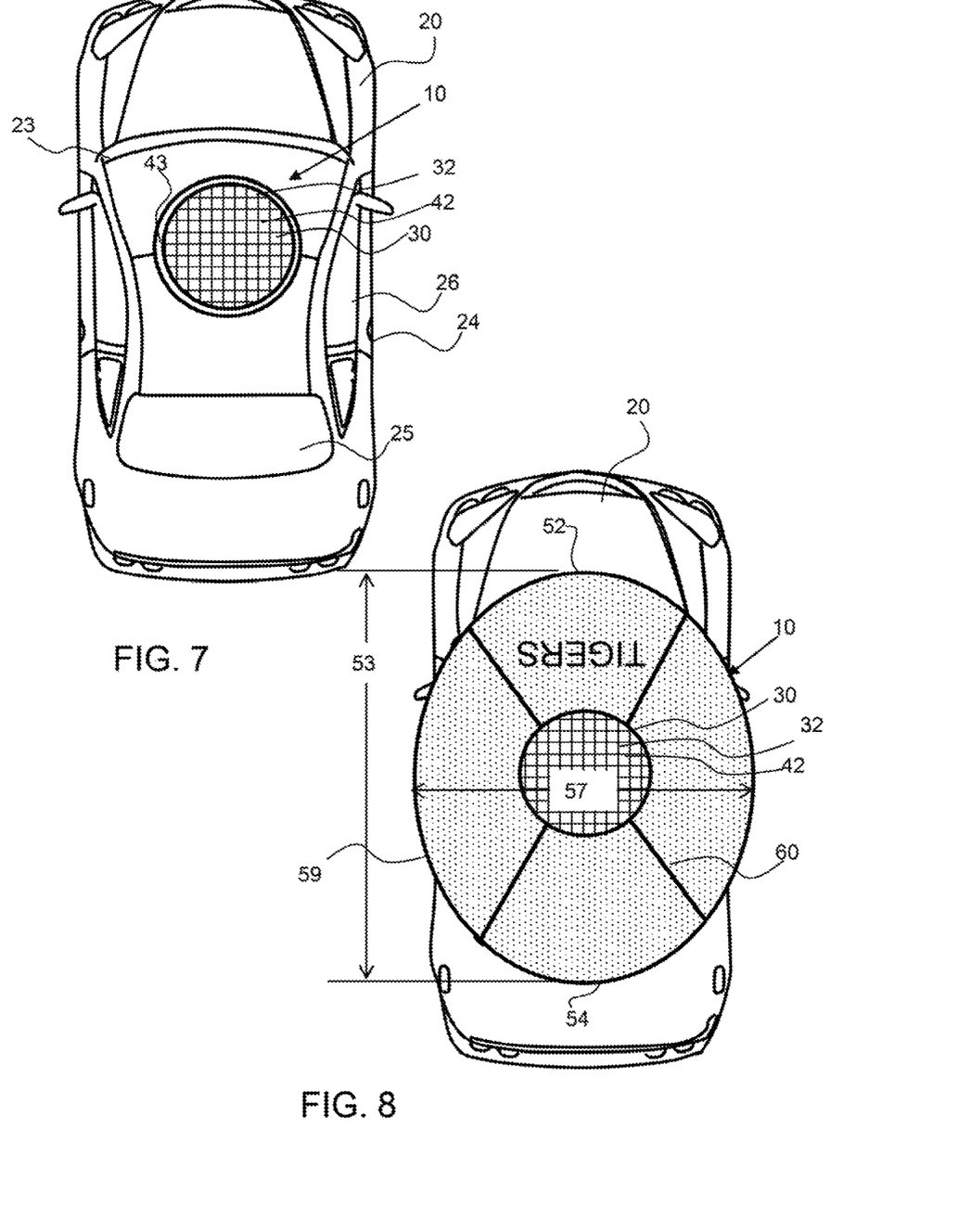
FIG. 7 shows a top view of a vehicle with an exemplary sunshade system mounted to the cabin-top of the vehicle and in a retracted orientation.
FIG. 8 shows a top view of a vehicle with an exemplary sunshade system mounted to the cabin-top of the vehicle and in a deployed orientation.

As shown in FIG. 7, a vehicle 20 is configured with an exemplary sunshade system 10 mounted to the cabin-top 21 of the vehicle and in a retracted orientation. The canopy enclosure is closed with the perimeter gap being closed.

As shown in FIG. 8, a vehicle 20 is configured with an exemplary sunshade system 10 mounted to the cabin-top 21 of the vehicle and in a deployed orientation. The canopy 50 extends out from the canopy enclosure 30 and extends a width 57 and length 53. The perimeter of the canopy 59 is curved or oval shaped as shown. The canopy 50 extends over the windshield and the back window of the vehicle. The canopy enclosure 30 has a top 32, a bottom and a perimeter gap from which the canopy deploys from. The canopy is supported in the deployed orientation by support members 60.

Figure 9:
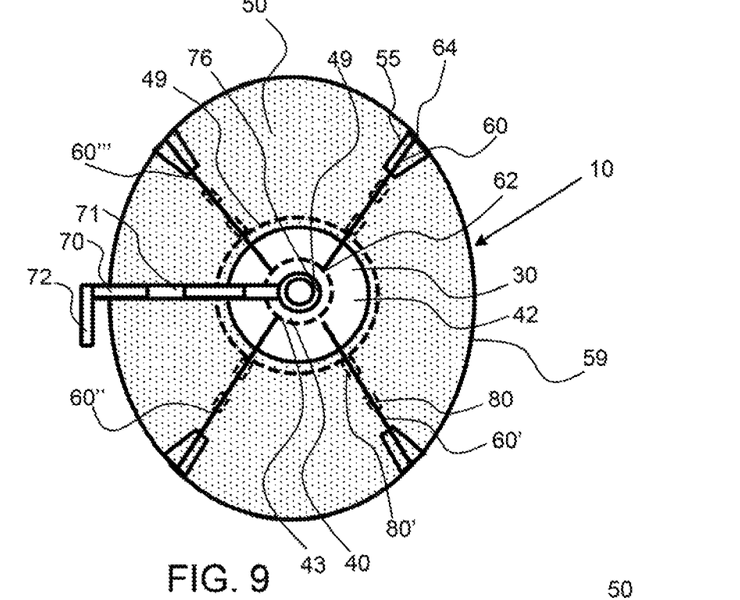
FIG. 9 shows a top view of an exemplary sunshade system in a deployed orientation and having a canopy with an oval outer perimeter shape.
Figure 10:
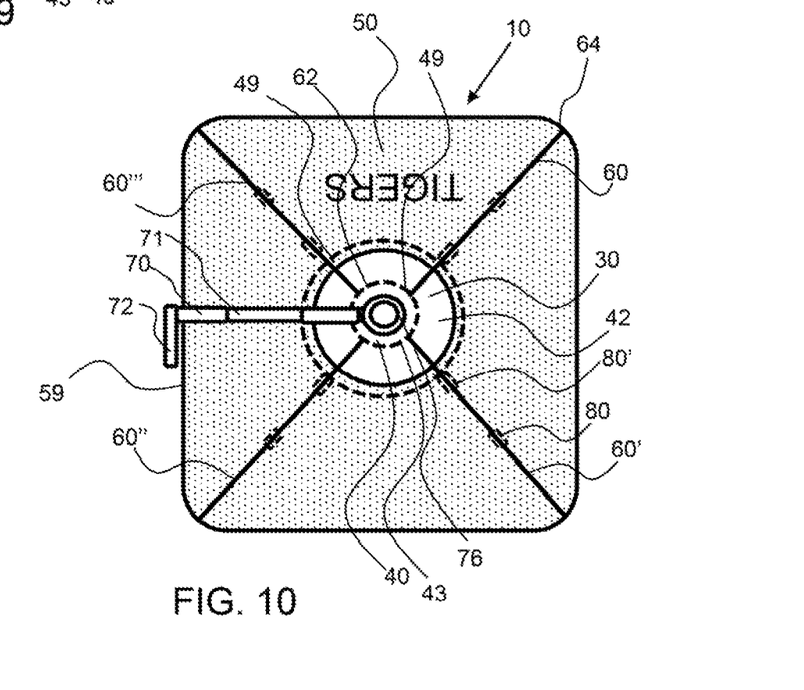
FIG. 10 shows a top view of an exemplary sunshade system in a deployed orientation and having a canopy with a rectangular outer perimeter shape.

As shown in FIG. 9, an exemplary sunshade system 10 is in a deployed orientation and has a canopy 50 with an oval outer perimeter 59 shape. There are four support members 60-60''' that extend from the hub 40 to the perimeter of the canopy to secure the canopy in the deployed orientation. The support members 60 have a connected end 62, connected to the hub 40, and an extended end 64, that is retained by a receiver 55. A crank 70 extends from the canopy enclosure 30 and may be used to retract the canopy back to a stored or retracted orientation. A crank may comprise a handle 72 for ease of use and a crank extension 71, that may be telescoping, as shown in FIGS. 9 and 10. The crank 70 may be used to manually retract the canopy back into hub, such as by rotating the handle. The crank has an extension that extends out from the hub to a position proximal the side of the vehicle. This allows a user to stand at the side of the vehicle and manipulate the handle to rotate the hub and retract the canopy. The crank may retract back into the hub, such as by folding or rotating to a stored configuration. In an exemplary embodiment, the crank extension is telescoping to allow it to be pushed back toward the hub for storage.

A motor 76, such as an electric motor, is configured to retract the canopy and support members into the canopy enclosure. A user may use a remote device to activate the motor or may interface with a user interface on the sunshade system. The hub may comprise a hub-spring 49, such as a wound spring that winds about the center of the hub, and the hub-spring 49 may provide additional deploying force to elongate the support members, or may be a retraction hub-spring that provides a retraction force to pull the support members back into the hub. A hub-spring may be disengaged from the support members and a user may activate an engagement interface, to engage the retraction hub-spring to draw the support members back into the hub.

As shown in FIG. 10, an exemplary sunshade system 10 is in a deployed orientation and has a canopy 50 with a rectangular outer perimeter 59 shape. There are four support members 60-60''' that extend from the hub 40 to the perimeter of the canopy to secure the canopy in the deployed orientation. The support members 60 have a connected end 62, connected to the hub 40, and an extended end 64, that is retained by a receiver 55. A motor 76 is configured to retract the canopy and support members into the canopy enclosure. A user may use a remote device to activate the motor or may interface with a user interface on the sunshade system.

Figure 11:
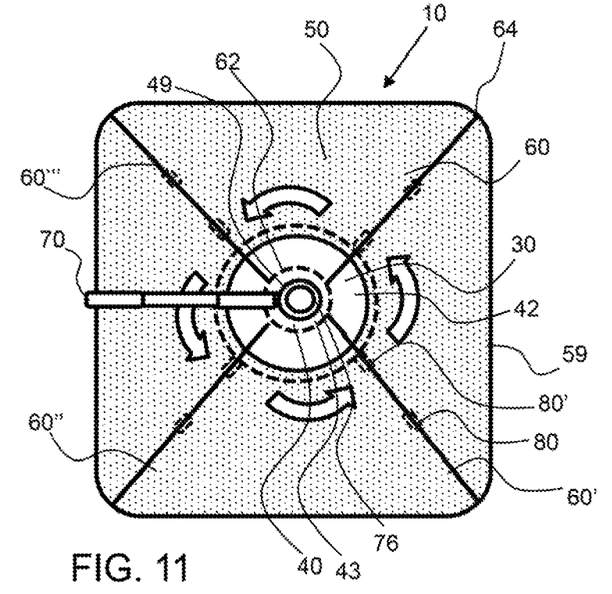
FIG. 11 shows a top view of an exemplary sunshade system and crank extending therefrom to retract the canopy back into the canopy enclosure.
Figure 12:
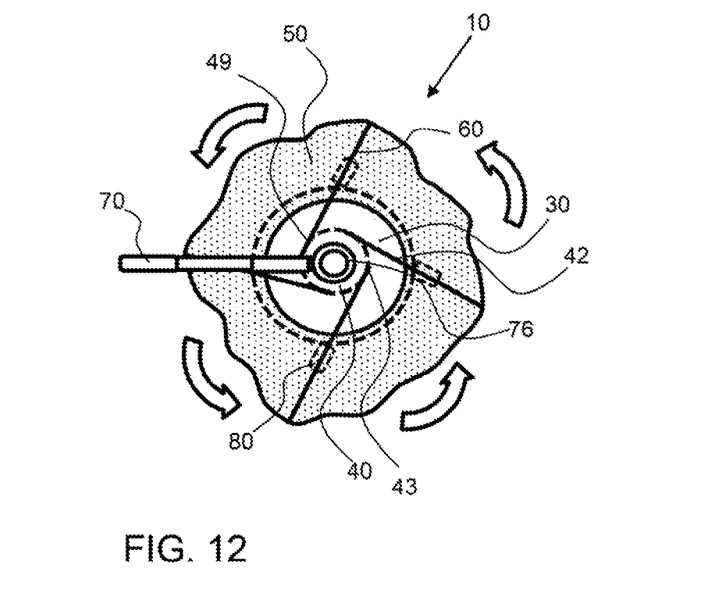
FIG. 12 shows the exemplary sunshade system shown in FIG. 11, in a partially retracted orientation.
Figure 13:
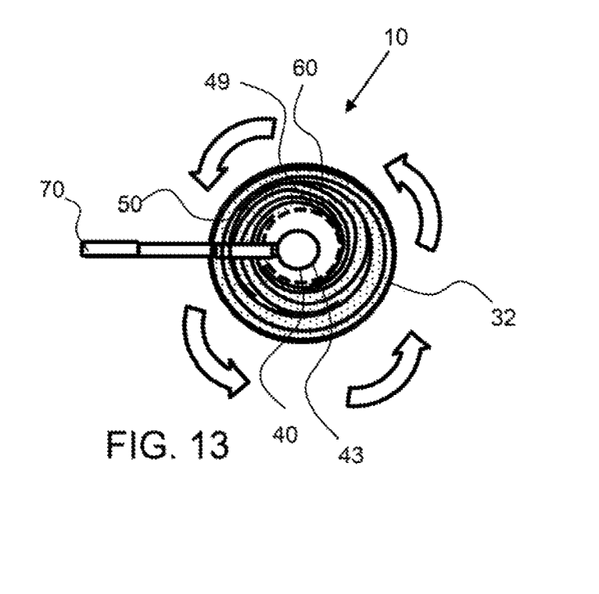
FIG. 13 shows the exemplary sunshade system shown in FIG. 11, in a partially retracted orientation.

Referring to FIGS. 11 to 14, the exemplary sunshade system 10 retracts by winding up around the hub 30. As shown in FIG. 11, the exemplary sunshade system 10 is beginning to retract, as indicated by the bold arrows. As shown in FIG. 12, the support members are being retracted around the hub and are pulling the canopy 50 in with them. As shown in FIG. 13, the canopy enclosure top is removed to more clearly show how the canopy support members are spiral wound around the hub 40.

Figure 14:
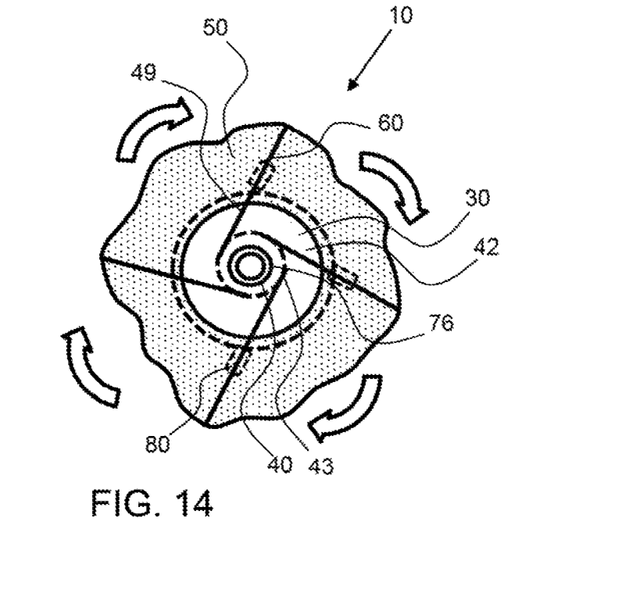
FIG. 14 shows the exemplary sunshade system automatically deploying from a retracted orientation, wherein the canopy is automatically deployed by stored energy in the support members.

As shown in FIG. 14, the canopy is automatically deploying by the release of the stored energy of the support members. When the canopy enclosure is opened, the support member may automatically unwind to extend out and deploy the canopy.

Figures 15, 16:
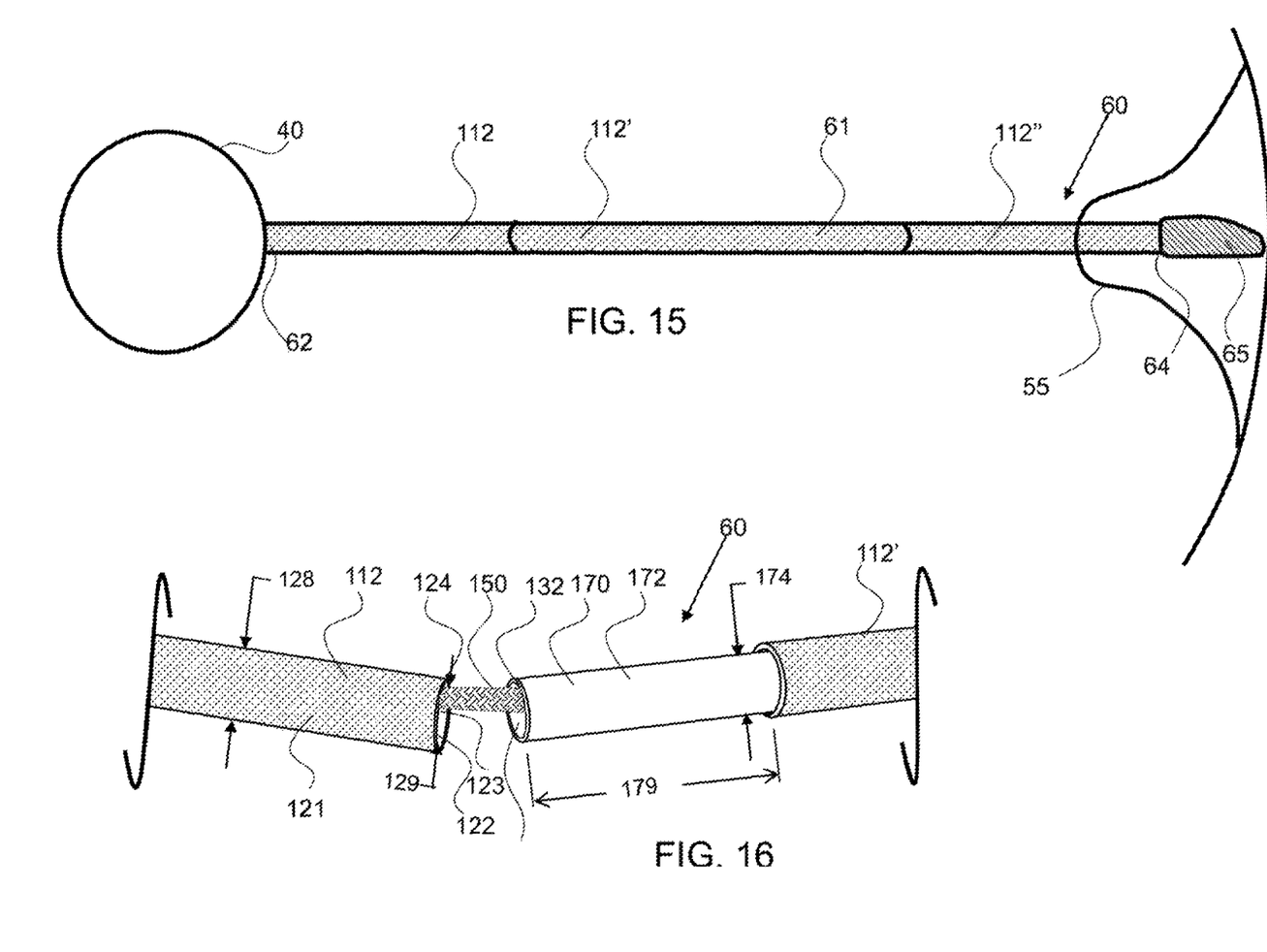
FIG. 15 shows a top view of an exemplary support member extending from a hub and into a receiver of the canopy, and having a plurality of coupled elongated
FIG. 16 shows a perspective view of an exemplary support member pulled apart to show the elastic tether.

As shown in FIG. 15, an exemplary support member 60 is a segmented support member 61 having a plurality of elongated supports 112-112''. The exemplary support member 60 has an attached end 62, coupled to the hub 40, and an extended end 64. An end adapter 65 may be configured on the extended end to retain the end of the support member with the receiver 55 of the canopy 50. The receiver 55 may be a sleeve or pocket for receiving and retaining the extended end 64 or end adapter 65 of the support member 60.

As shown in FIG. 16, an exemplary support member 60, comprises a plurality of elongated portions 112-112'. The first elongated portion 112 is pulled away from a second elongated portion 112', or detachably detached from the second elongated portion. The first end 124 of the first elongated portion 112 is disengaged from the first engagement end 132 of the second elongated portion 112'. The second elongated portion 112' has a truncated end 170 for insertion into the conduit 122 of the first elongated portion 112. The outside dimension 174, or diameter of the truncated end 170 is smaller than the inside dimension 129 of the first elongated portion 112. The outside surface 172 of the truncated end 170 will slide along the inside surface 123 of the conduit 122. The truncated end 170 has a length 179 that is configured to extend into the conduit 122 of the first elongated portion 112, thereby engaging the end of the second elongated portion 112' with the first elongated portion in a secure manner. The outside surface 121 of the first and second elongated portion have the same outside dimension 128 and therefore when the truncated end of the second elongated portion is inserted into the conduit of the first elongated portion, there is substantially no step, or change in outer dimension along the length of the support member in the transition therebetween. An elastic tether 150 extends along the conduit 122 of the first elongated portion 112 and the conduit 122 of the second elongated portion 112' and couples the two portions of the support member 60 together.

Figure 17:
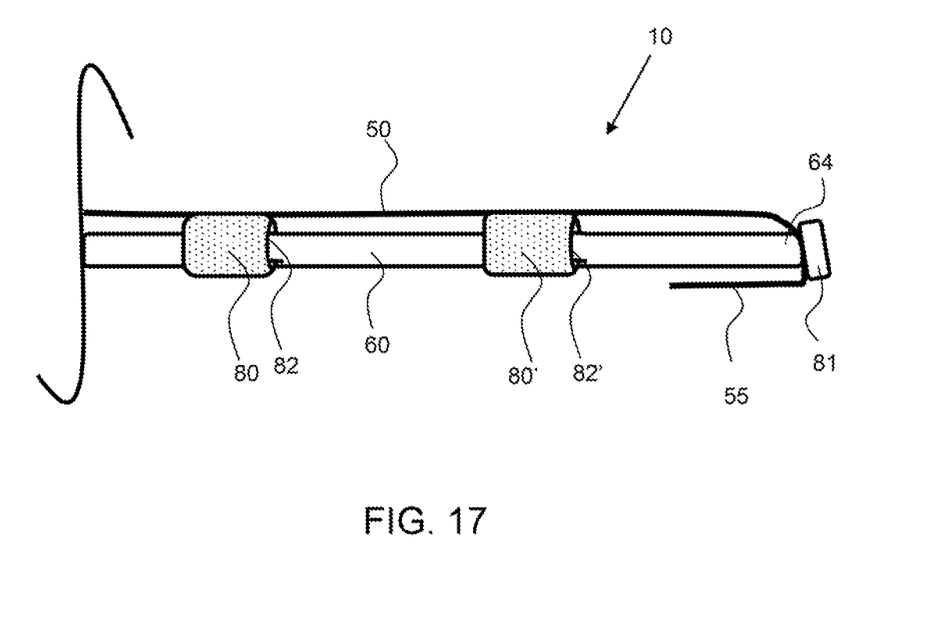
FIG. 17 shows a side perspective view of a support member retained to the canopy by a plurality of loops.

FIG. 17, shows a side view of an exemplary canopy 50 and a support member 60 retained by loops 80, 80' extending from the canopy. The support member extends through the apertures 82, 82 formed by the retaining loops. The extended end 64 of the support member is retained in a receiver 55, which may be a sleeve formed in the canopy. The extended end of the support member 60 may be attached to the canopy 50. The end of the support member may engage with the canopy to secure the end to the canopy. A fastener 81 may couple the support member to the canopy and may extend through the canopy to attach to the support member, such as a bolt or screw, for example. A grommet may be configured around the canopy and the fastener that extends therethrough to prevent tearing of the canopy.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An automatically deploying sunshade system for a vehicle comprising:
   a) a canopy having an outer perimeter and a reflective upper surface;
   b) a canopy enclosure for retaining the canopy when in a stored orientation said canopy enclosure comprising:
      i) a top portion;
      ii) a bottom portion; and
      iii) a perimeter gap when the canopy is in a deployed orientation;
   wherein the canopy is deployed from the perimeter gap;
   c) a hub; and
   d) a plurality of support members having a connected end connected to the hub and an extended end that extends out toward the outer perimeter of the canopy and is attached to the canopy;
   wherein the plurality of support members are segmented flexible rods comprising:
      a plurality of elongated supports;
      an elastic tether extending within and coupling together the plurality of elongated supports;
   wherein the plurality of support members are flexible and are coiled around the hub when the canopy is in said stored orientation within the canopy enclosure;
   wherein the plurality of support members have stored energy when coiled around the hub and wherein the plurality of support members automatically uncoil from the hub to deploy the canopy to a deployed orientation; and
   e) a motor coupled to the hub to turn the hub and retract the canopy and support members from a deployed orientation to a stored orientation.

2. The automatically deploying sunshade system of claim 1, wherein the canopy is a flexible sheet.

3. The automatically deploying sunshade system of claim 1, wherein the canopy is a flexible fabric.

4. The automatically deploying sunshade system of claim 1, wherein the segmented flexible rods each comprise at least three elongated supports coupled together by an elastic tether.

5. The automatically deploying sunshade system of claim 1, wherein the plurality of elongated supports of each of the plurality of support members are detachably attachable.

6. The automatically deploying sunshade system of claim 5, wherein at least one of the plurality of elongated supports comprises a truncated end for insertion into a conduit of at least one of the plurality of elongated supports.

7. The automatically deploying sunshade system of claim 1, wherein the top and bottom portion close to retain the canopy within the canopy enclosure and close the perimeter gap when in a stored orientation.

8. The automatically deploying sunshade system of claim 1, wherein the canopy enclosure comprises a latch to secure the top and bottom portion together when the canopy is in a stored orientation.

9. The automatically deploying sunshade system of claim 1, wherein the hub spins in a first direction to retract the support members from a deployed orientation to a closed orientation and spins in second direction, opposite to the first direction, to deploy the support members and canopy attached to the support members from a stored orientation to a deployed orientation.

10. The automatically deploying sunshade system of claim 1, further comprising a receiver for retaining an extended end of the support member.

11. The automatically deploying sunshade system of claim 1, further comprising a loop extending from the canopy to retain the support member to the canopy.

12. The automatically deploying sunshade system of claim 1, further comprising a photovoltaic cell and a power system, wherein the photovoltaic cell produces power that powers the motor.

13. The automatically deploying sunshade system of claim 1, wherein the canopy is detachably attached from the plurality of support members and interchangeable with a second canopy.

\* \* \* \* \*